United States Patent [19]

George

[11] Patent Number: 4,625,752

[45] Date of Patent: Dec. 2, 1986

[54] FLUSHING SIPHON

[76] Inventor: John A. George, R.R. 1, Uniontown, Kans. 66779

[21] Appl. No.: 239,633

[22] Filed: Mar. 2, 1981

Related U.S. Application Data

[63] Continuation-in-part of Ser. No. 43,692, May 30, 1979, Pat. No. 4,319,601, which is a continuation-in-part of Ser. No. 821,404, Aug. 3, 1977, Pat. No. 4,181,142.

[51] Int. Cl.⁴ .......................................... F04F 10/00
[52] U.S. Cl. .................................. 137/124; 137/133; 137/138; 137/139
[58] Field of Search ................. 137/124, 133, 138, 139

[56] References Cited

U.S. PATENT DOCUMENTS

| | | |
|---|---|---|
| 222,885 | 12/1879 | Field . |
| 343,853 | 6/1886 | Rosewater . |
| 763,641 | 6/1904 | Shone et al. .................... 137/138 X |
| 1,297,280 | 3/1919 | Weston . |
| 2,762,202 | 9/1956 | Ponsar . |
| 3,079,939 | 3/1963 | Lapray .............................. 137/128 |
| 4,181,142 | 1/1980 | George .......................... 137/139 X |
| 4,182,123 | 1/1980 | Ueda . |

FOREIGN PATENT DOCUMENTS 179684 12/1906 Fed. Rep. of Germany ...... 137/124

OTHER PUBLICATIONS

ASAE Paper No. 75-4553.

Primary Examiner—Gerald A. Michalsky
Attorney, Agent, or Firm—Litman, Day & McMahon

[57] ABSTRACT

A siphon is provided having a generally S-shaped configuration with a widely flaring inlet and discharge. The siphon is adapted for use with a fluid storage tank which is positioned adjacent a trough to be flushed by the siphon. The siphon discharge opens upward onto a floor surface of the trough. The siphon inlet is provided with a weep hole. The siphon includes a trigger mechanism which activates a flushing mode of the siphon during a flushing cycle. Multiple siphons may be interconnected by the trigger mechanism so as to produce simultaneous flushing thereof.

5 Claims, 9 Drawing Figures

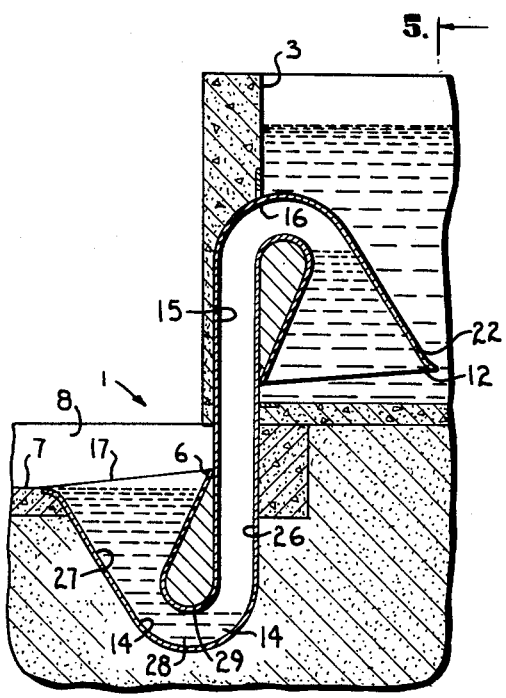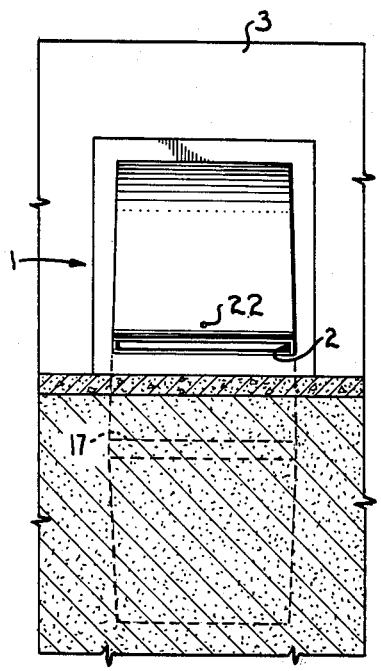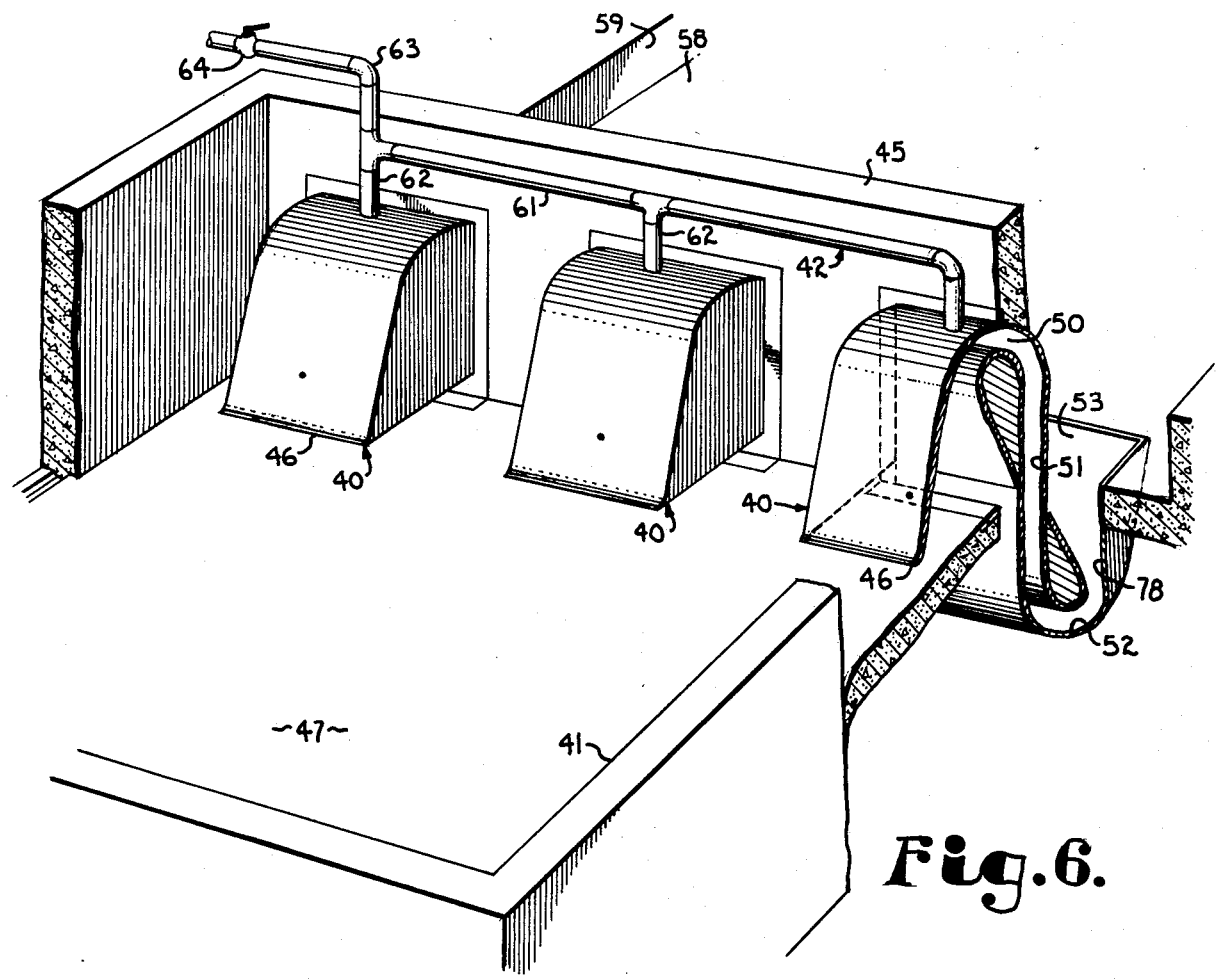

FLUSHING SIPHON

CROSS-REFERENCE TO RELATED APPLICATIONS

The present application is a continuation-in-part of the U.S. application Ser. No. 43,692, filed May 30, 1979, entitled TRIGGER MECHANISM FOR SIPHON APPARATUS, now U.S. Pat. No. 4,319,601 which was a continuation-in-part of U.S. patent application Ser. No. 821,404 filed Aug. 3, 1977 entitled SIPHON APPARATUS, now U.S. Pat. No. 4,181,142.

BACKGROUND OF THE INVENTION

The present invention relates to siphons, in particular, flushing siphons for cleaning a trough of a livestock enclosure by flushing relatively high volumes of water at a relatively high velocity across the trough.

Siphons are quite frequently used in agricultural enclosures for livestock to provide a more or less high velocity and high volume flow of water across a dirt and manure catching trough in a relatively short time so as to flush same. It is often desirable to have these siphons function automatically with a high degree of dependency while being relatively simple in design and inexpensive to produce. It is also important that these siphons have few if any moving parts to be fouled or jammed by the debris in the waste water typically used for such flushing systems.

It is also important for the siphon to repeatedly flush at a predetermined time in the flushing sequence. If the siphon flushes too early, there is an insufficient cleaning of the trough and such early flushing may produce a continuous flowthrough of the siphon such that the flushing sequence must be manually restarted. It is also important that the siphon flush before same fills too full and somewhat vigorously such that there is not a continual runthrough of the flushing water which can also be produced when the siphon is overfilled. In order to initiate the flushing action at the proper point in the flushing sequence, it is important to properly fill the lower liquid trap and an upper air trap of the siphon. It is also desirable to have an automatic trigger mechanism which initiates flushing at a relatively constant point during flushing sequence.

The present invention provides a siphon having a discharge which opens upwardly and relatively flush or in low profile with respect to the floor of the trough being flushed. The upstream end of the siphon discharge may be canted slightly upward to urge the flow of the liquid downstream of the siphon and through the trough. The discharge mouth flairs or diverges substantially so as to reduce the velocity of the flow of liquid flowing through the siphon and to ensure that fluid is retained within the discharge at the end of the flush cycle. This in turn ensures that fluid will be in the liquid trap so as to prime same for the next sequential flushing cycle. A large flared inlet with a weep hole therein also ensures that the air trap will be properly filled with air at the beginning of each flushing cycle. A trigger mechanism is utilized to automatically activate the vigorous flushing action of the siphon preferably before fluid within the fluid storage vessel overflows the air trap into the liquid trap. Other hydraulic principles such as a convergence of the cross-sectional area of the siphon within the region associated with the inlet between the inlet and the air trap, especially in conjuction with continuous generally smooth opposite side walls of the siphon, increases the hydraulic efficiency of the device.

It is also desirable that multiple siphons may be utilized to flush a relatively wide trough simultaneously from a single liquid storage tank.

Further, it is desirable to have a unitized, preferably prefabricated, siphon structure which allows one unskilled in the art of flushing siphons to install such a siphon with a high degree of probability that the siphon will operate. This is especially true, since flushing siphons may be tempermental if poorly designed or built and may fail to operate as desired if improperly built.

OBJECT OF THE INVENTION

Therefore, the objects of the present invention are: to provide a siphon which has a relatively high dependability and requires very little care or adjustment; to provide such a siphon which is hydraulically efficient and clean; to provide such a siphon having a discharge which opens upward and generally flush relative to a floor of a trough to be cleaned thereby; to provide such a siphon having a relatively wide cross-sectional area in the region of the discharge to reduce liquid velocity therethrough and ensure proper refill of a liquid trap associated with the siphon after each flushing cycle; to provide such a siphon having means to simply and dependably ensure that an air trap associated with the siphon is properly refilled after each flushing cycle; to provide such a siphon having a trigger mechanism for reliably and automatically activating flushing action of the siphon when fluid in a storage tank associated with the siphon reaches a predetermined level; to provide such a siphon wherein the trigger mechanism may also be manually operated; to provide such a siphon which may be ganged in multiples to provide for flushing a relatively wide trough; to provide a unitized siphon construction which is adapted to be prefabricated and easy to install; to provide such a siphon which is relatively easy to manufacture and relatively non-susceptible to clogging or fouling; and to provide such a siphon having a relatively long life and being particularly well adapted for the proposed usage thereof.

Other objects and advantages of this invention will become apparent from the following description taken in connection with the accompanying drawings wherein are set forth by way of illustration and example, certain embodiments of this invention.

SUMMARY OF THE INVENTION

A flush siphon is provided having a discharge which opens upwardly and generally flush or in low profile with respect to a floor surface to be flushed by the siphon. The flushing siphon of the present invention is a generally S-shaped structure which preferably has relatively smooth continuous side walls so as to be hydraulically efficient. The siphon comprises a lower liquid trap having at one end thereof the siphon discharge, a generally vertical downcomer or throat attached to an opposite end of the liquid trap, and an airtrap flow communicating with the throat at one end thereof and opening upon an inlet at an opposite end thereof. Preferably, the throat is of a generally uniform horizontal cross-section therealong. The inlet of the siphon is adapted to communicate with and draw fluid from a fluid storage or holding reservoir. The holding reservoir is normally continuously being filled and the siphon periodically releases substantially all of the fluid contained within the holding vessel at an end of a flushing cycle such that the fluid is discharged on the floor surface of the trough which is desired to be flushed.

The siphon discharge is preferably widemouthed or flared such that the cross-sectional width of the siphon diverges substantially in cross-sectional area in the region between the throat or liquid trap and the discharge. This wide-mouth feature of the discharge slows the velocity of the fluid passing through the siphon so as to prevent all the fluid at an end of the flushing cycle to be discharged from the siphon but rather retains a portion of this fluid within the discharge. The liquid trap is vertically spaced beneath the discharge and is filled or primed with the fluid left in the discharge at the end of a flushing cycle. Thus, the wide-mouth feature of the discharge tends to insure that there will be substantially enough fluid within the liquid trap for the start of a new flushing cycle. In particular, it is necessary that a sufficient amount of fluid be in the liquid trap at the beginning of the flushing cycle so that the liquid trap will prevent air from bypassing same until such time as triggering of the flushing of fluid through the siphon is desired. Preferably, the siphon discharge is raised slightly toward the rear or upstream side thereof, that is opposite the direction desired for fluid flow and closest to the downcomer, in the range of 3° to 15°, especially 7° from horizontal as compared to the front or downstream side thereof. This slight raise tends to urge the fluid to flow down the trough in the desired direction.

The siphon inlet is divergent or flared in cross-section in the region near the mouth thereof. Preferably, the inlet is tapered so as to be hydraulically efficient and is shaped essentially as the discharge. In a particularly effective siphon, walls of the inlet and discharge closest to the throat are in the same plane. Such walls and those opposite thereto are angled with respect to vertical in the nature of 25° to 35°. The remaining walls of the inlet extend generally vertically and are generally coplanar with associated walls of the discharge and throat. The height of the siphon inlet is somewhat above the height of the siphon outlet and the difference in vertical distance between the two defines the effective head of the siphon. The siphon inlet region also contains a weep hole spaced intermediate the siphon inlet and the airtrap. The weep hole communicates between the interior of the siphon and the fluid storage tank and is of a relatively small cross-sectional area as compared to the siphon inlet. The weep hole assures that any vacuum which might be in the siphon at the end of a flushing cycle which would tend to hold liquid within the siphon above the siphon inlet is broken such that the air trap is assured of being full of air at the beginning of a flushing cycle.

Preferably the siphon is a unitary and prefabricated construction. The material of construction of the siphon may be fiber glass reinforced plastic, sheet metal or the like.

In one embodiment, the siphon functions in the following manner. At the beginning of a flushing cycle, the siphon will have just completed emptying the storage tank of fluid. The siphon liquid trap will be preferably filled with liquid almost to or equal to the height of the siphon outlet and the air trap will be completely free of liquid. As liquid builds up in the tank past the level of the weep hole, air begins to compress within the siphon air trap and is prevented from escaping the siphon by the liquid in the liquid trap. The hydraulic pressure produced by the continuing increase of height of liquid in the storage tank further compresses the air in the air trap and creates an equal differential in the height of the liquid on opposite sides of the liquid trap, that is the liquid column associated with the siphon discharge is higher than liquid column associated with the downcomer or throat. As the height of the liquid leg of the liquid trap associated with the downcomer reaches the lowermost point thereof at which air is free to bypass the liquid trap, air starts bubbling or flowing through the liquid trap so as to pass up to and out of the siphon discharge. When this occurs, there is suddenly little or no force against the hydraulic pressure building up in the storage tank. The liquid in the storage tank then vigorously rushes through the siphon to meet the liquid in the liquid trap which activates an energetic and dynamic passage of the water in the storage tank through the siphon and out the siphon discharge onto the floor surface of the trough to be flushed. After substantially all of the water is drawn from the holding tank by the siphon, the siphon will lose head while sucking air through the weep hole so as to completely discontinue flow of fluids through the siphon. Sufficient fluid will remain and settle into the liquid trap through the siphon discharge so as to prime same for the next flushing cycle.

In a preferred embodiment, a trigger mechanism or burp tube is utilized in conjunction with the siphon. The burp tube communicates with an upper end of the air trap and with liquid in the region of the siphon discharge so as to form a liquid trap within the tube. In a particular embodiment, the burp tube will comprise a J-loop or J-tube having an outlet vertically near the same level as the floor surface to be flushed and including a liquid trap. This liquid trap is positioned such that the highest point around which air may bypass same is higher than the highest point around which air may bypass the liquid trap of the siphon. In this manner air will bypass through the burp tube first, preferably in a vigorous manner so as to generally eject most of the liquid within the burp tube therefrom. By relieving pressure on the air trapped in the siphon through the burp tube, a more accurate triggering of the flushing action of the siphon can be accomplished and the siphon will more reliably trigger at substantially the same time during each flushing cycle whereat the liquid level in the storage tank reaches a predetermined height and multiple siphons can be triggered by the same burp tube. The burp tube liquid trap is refilled at the end of each flushing cycle in a manner similar to the refilling of the siphon liquid trap. The burb tube may be entirely or only partly contained within the downcomer, siphon liquid trap, and/or the siphon air trap.

Through utilization of a common burp tube, multiple or ganged siphons may be triggered simultaneously so as to flush a wide trough or the like. The burp tube for a ganged siphon arrangement is connected to the air trap of each of individual siphons. When the air pressurizes within the interconnected air traps to a pressure sufficient to bypass the liquid trap of the burp tube, all of the siphons simultaneously trigger and begin a flushing mode.

The drawings constitute a part of this specification and include exemplary embodiments of the present invention and illustrate various objects and features thereof.

BRIEF DESCRIPTION OF THE DRAWINGS

FIG. 4 is an enlarged cross-sectional view of the siphon and the holding tank similar to the view shown in FIG. 3, with the liquid shown therein just prior to initiation of a flushing action within the flushing cycle.

FIG. 5 is a fragmentary and enlarged rear elevational view of the siphon and holding tank taken along line 5—5 of FIG. 4.

FIG. 6 is a perspective view of a modified embodiment of the siphon according the present invention, showing use of multiple siphons in conjunction with a trigger mechanism and a holding tank, with portions broken away to show detail thereof.

DETAILED DESCRIPTION OF THE PREFERRED EMBODIMENTS

Figure 1:
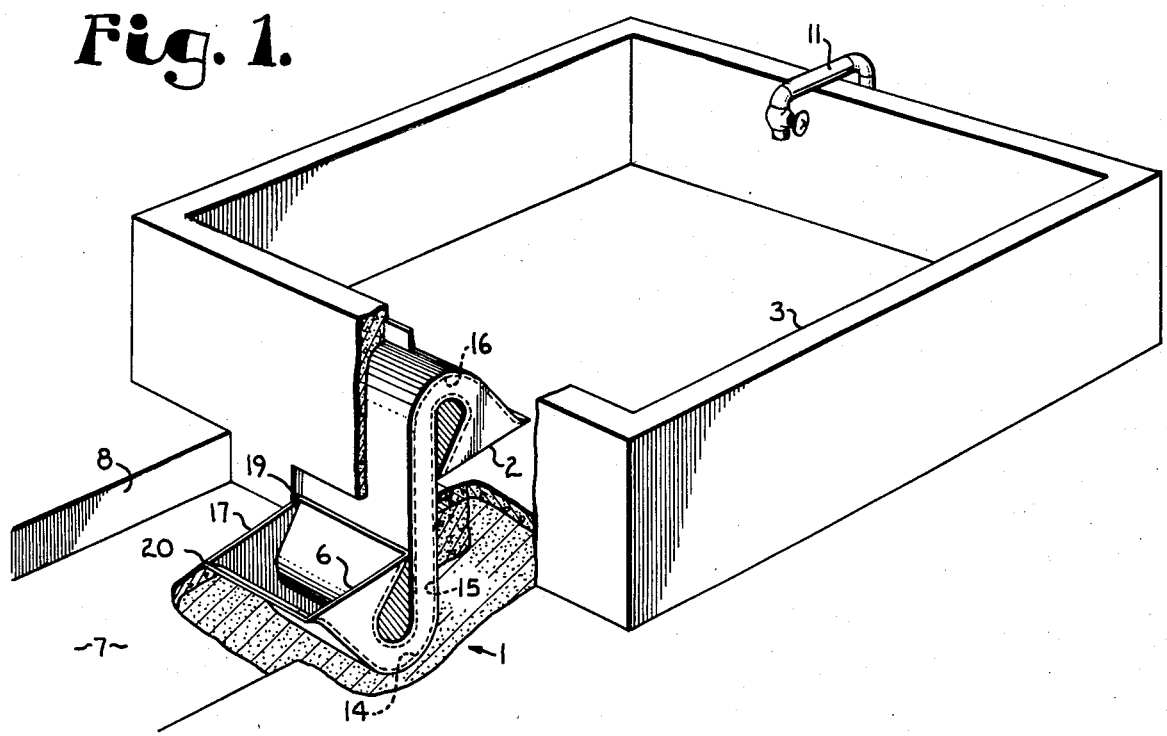
FIG. 1 shows a perspective view of a flushing siphon according to the present invention in combination with a fluid storage tank and a trough to be flushed thereby, with portions broken away to show detail thereof.
Figure 2:
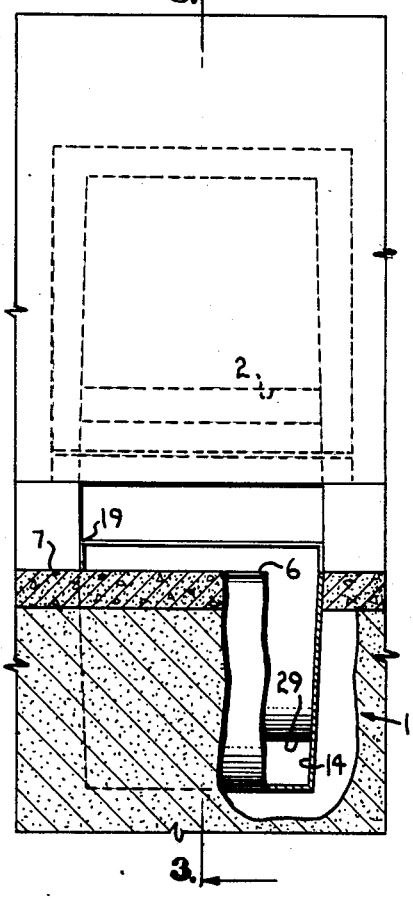
FIG. 2 is an enlarged and fragmentary front elevational view of the siphon and storage tank with portions broken away to show detail thereof.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

With reference to the embodiments disclosed in FIGS. 1 through 5, the reference numeral 1 generally designates a flushing siphon according to the present invention. The siphon 1 is positioned such that an inlet thereof flow communicates with an interior of a holding tank or vessel 3, while a siphon outlet or discharge 6 opens generally upward and onto a floor surface 7 of a trough 8 to be flushed by the siphon 1. The holding tank 3 may be any device suitable for retaining a fluid therein and is normally continuously filled with a flushing fluid, such as water, by a conduit 11 or the like which may be manually or automatically controlled. The siphon 1 comprises a liquid trap 14, a throat or downcomer 15, and an air trap 16. The liquid trap 14 communicates with the siphon discharge 6 on one side thereof and with the downcomer 15 on the other side thereof. The air trap 16 likewise communicates with the downcomer 15 on one side thereof and with the siphon inlet 2 on the other side thereof. Both the siphon inlet 2 and discharge 6 are substantially divergent as compared to the cross-sectional area of the downcomer 15. In particular, the siphon 1 begins diverging near the bottom of the liquid trap 14 and continues to diverge in the region of the discharge 6 in a generally uniform manner to an exterior perimeter 17 of the discharge 6 forming a V or fan shape when viewed from the side, as in FIG. 3. In a like manner, the siphon 1 begins diverging near the top of the air trap 16 toward the inlet 2 thereof forming an inverted V or fan shape when viewed from the side. Preferably, the siphon discharge 6 and inlet 2 have a cross-sectional area from two to six times the cross-sectional area of the downcomer 15 or the bottom of the liquid trap 14. Preferably, the upper half of the siphon 1 is generally symmetrical to the lower half thereof except for being rotated 180° and inclusion of the weep hole 22 in the upper half.

The siphon discharge 6 opens upwardly and substantially flush with the floor 7, so as to present a low profile with respect thereto. However, the discharge 6 is raised slightly near the rear 19 thereof as compared to the front 20 thereof. The siphon 1 is substantially bell shaped near the inlet 2 thereof so as to improve the hydraulic efficiency thereof. A weep hole 22 communicates between the siphon interior 23 and the interior of the holding tank 3. The weep hole 22 is of substantially smaller cross-sectional area than the siphon inlet 2.

The downcomer 15 of the illustrated embodiment is substantially vertically aligned. The inlet 2 is vertically spaced above the discharge 6 and below the weep hole 22. The weep hole 22 must be located beneath the air trap 16.

Figure 3:
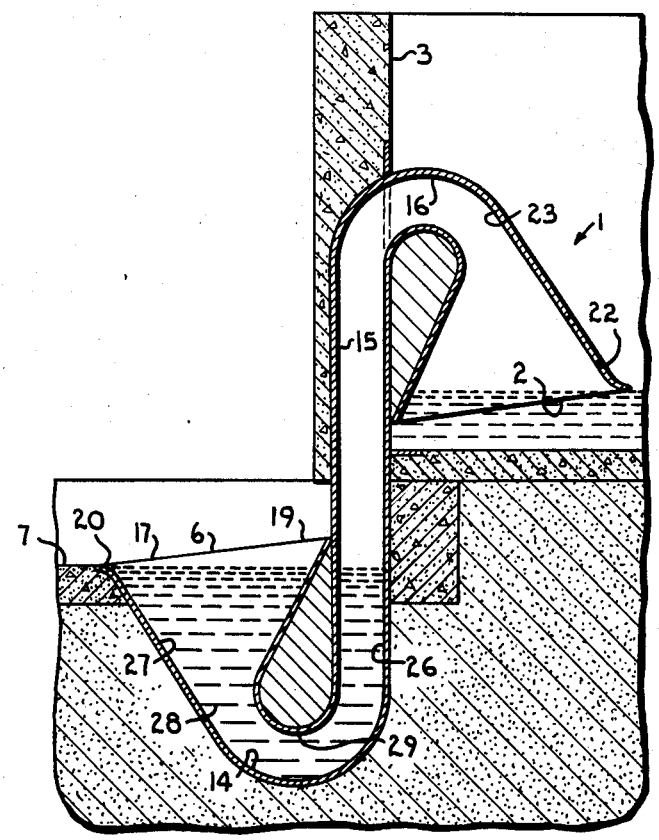
FIG. 3 is an enlarged cross-sectional view of the siphon in the storage tank taken along line 3—3 of FIG. 2, showing liquid levels at the beginning of a flushing cycle.

In use the siphon 1 functions as follows. The siphon 1 is originally primed or provided with liquid in the liquid trap 14 thereof. Thereafter liquid, normally water with some contamination, is allowed to flow into the holding tank at a relatively constant rate. As the level of fluid in the holding tank 3 increases, there is little change in the siphon 1 until the level in the holding tank 3 reaches that of the weep hole 22. Thereafter, further increases in the level of the holding tank 3 create a hydraulic head which pressurizes air within the air trap 16. Upon pressurization of the air in the air trap 16, an equal pressure is exerted against the leg 26 of the liquid trap 14 associated with the downcomer 15 such that the liquid level therein becomes relatively lower as compared to the liquid level in the opposite leg 27 of the liquid trap 14 associated with the discharge 6. An example of liquid 28 in the liquid trap at the beginning of the flushing cycle is seen in FIG. 3. An example of the liquid 28 in the liquid trap 14 just prior to the flushing mode of the flushing cycle is seen in FIG. 4. In particular, as the liquid level in the liquid trap leg 26 approaches that level associated with the upper side 29 of the lowest part of such a liquid trap whereat air will bypass the liquid trap and pass to the siphon discharge 6, the air will so bypass the liquid trap 14 and the air pressure in the air trap 16 will suddenly decrease substantially. Upon this sudden decrease in air pressure in the air trap 16, liquid within the holding tank 3 surges through such an air trap 16 into the downcomer 15 whereat it joins dynamically with the liquid remaining in the liquid trap 14. This initiates spontaneous and vigorous flushing action of the siphon and substantially all of the liquid within the holding tank 3 passes through the siphon onto the floor surface 7. Because of the divergence of the siphon 1 in the region of the discharge 6, liquid velocity slows and tends to accumulate therein near the end of the flushing cycle so as to fill the liquid trap 14 for the next cycle, as shown in FIG. 3.

As seen in FIG. 3, preferably the siphon 1 has no sharp edges or other structural irregularities which will reduce hydraulic efficiency thereof.

Also preferably, the siphon 1 is manufactured as a unitized or integral and prefabricated unit which can easily be installed in a wall of the holding tank 3 during construction of the latter.

A modified embodiment of a flushing siphon is illustrated in FIGS. 6 through 9 and is generally designated by the reference numeral 40. In FIG. 6 a plurality of the flushing siphons 40 are shown in association with a fluid holding tank 41 and a trigger mechanism 42. In particular, the flushing siphons 40 are aligned along a side wall 45 of the holding tank so as to pass therethrough. An inlet 46 of each siphon 40 opens into the interior of the holding tank 41 and is generally vertically spaced from and open toward a floor 47 of the holding tank 41.

Figure 7:
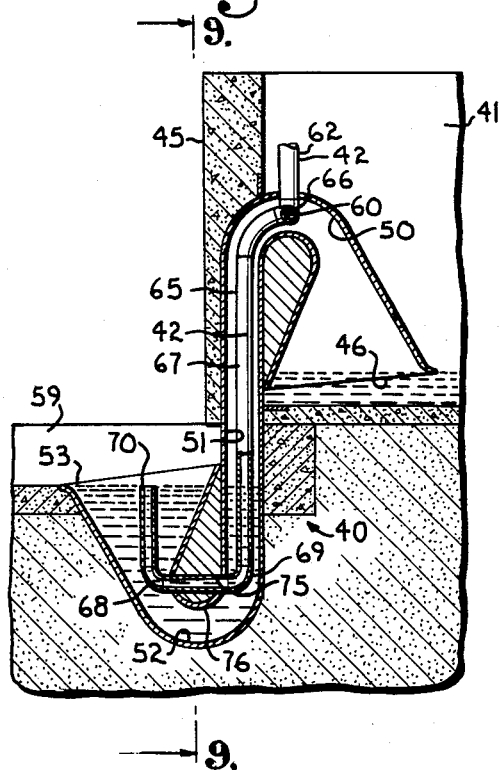
FIG. 7 is a fragmentary and vertical cross-sectional view of the modified siphon with the holding tank and the trigger mechanism shown in FIG. 6, having a liquid level shown at the beginning of a flushing cycle.

Each of the flushing siphons 40 is similar in configuration to the flushing siphon 1. In particular, each flushing siphon 40 has associated therewith the inlet 46, an air trap 50, a downcomer 51, a liquid trap 52, and an outlet or discharge 53. In the illustrated embodiment, as seen in FIG. 7, the downcomer 51 is substantially vertically aligned and positioned within the wall 45 of the holding tank 41 and simply joins the air trap 50 and liquid trap 52. Each siphon discharge 53 opens onto a floor structure 58 of a trough 59. Each of the outlets 53 are wide mouthed as compared to the cross-sectional area of the downcomer 51 or lower portion of the liquid trap 52 and open substantially upward and flush with the trough floor 58 being canted just slightly upward near the holding tank side thereof so as to urge liquid flowing therefrom along the trough 59.

Figure 8:
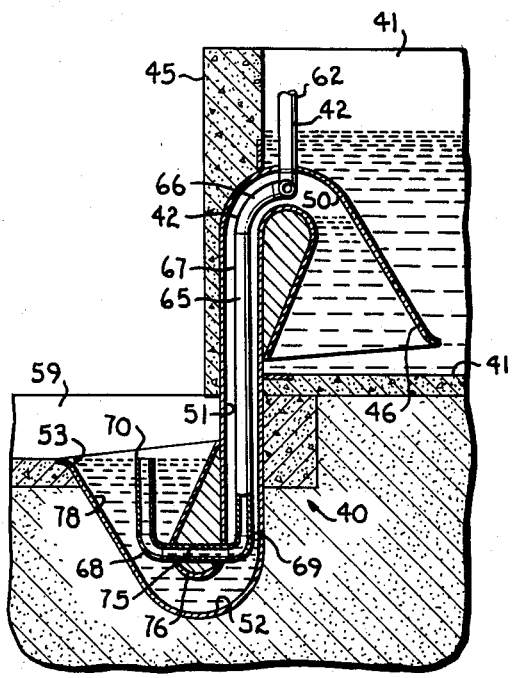
FIG. 8 is a fragmentary and vertical cross-sectional view of the modified siphon as shown in FIG. 7 except that the liquid level therein is shown just prior to activation of the flushing action of the siphon.
Figure 9:
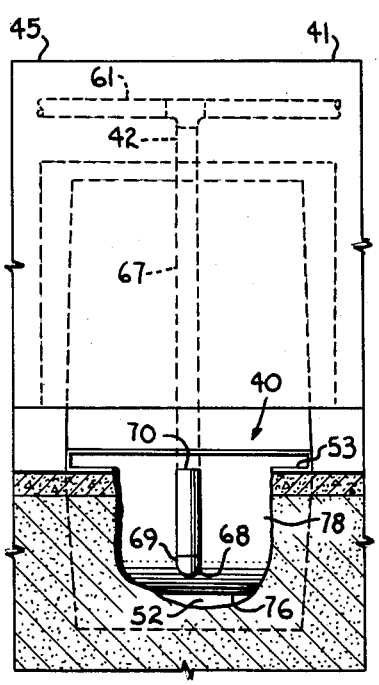
FIG. 9 is a fragmentary and cross-sectional view of the modified siphon taken along line 9—9 of FIG. 7 with portions broken away to show detail thereof.

The trigger mechanism 42, as is illustrated, interconnects each of the flushing siphons 40 at the air traps 50 thereof. In particular, a conduit 61 is flow connected with the interior of the siphon air trap 50 by suitable branches 62 through apertures 60 opening into each air trap 50. A side branch 63 is also interconnected with the conduit 61 and has a manual valve 64 thereon for optionally manually controlling the flushing cycle of the siphons 40. The trigger mechanism 42 also includes a J-loop or tube 65 having an upper end 66 communicating with an upper end of one of the siphons 40 and also interconnecting with the conduit 61. The J-loop 65 also includes a downcomer 67 and a liquid trap 68 at a lower end 69 thereof. The trigger mechanism liquid trap 68 opens into the siphon liquid trap 52 near the discharge 53 and, in the particular embodiment disclosed, discharges approximately at the level of the floor 58. As seen in FIGS. 7 and 8, the lowest part of the trigger mechanism liquid trap 68 is necessarily positioned above the lowest part of the siphon liquid trap 52. In particular, the lowest location at which air may bypass the trigger mechanism liquid trap 68, as designated by the reference numeral 75, is vertically spaced above the point whereat air will bypass the siphon liquid trap 52, as is designated by the reference numeral 56. It is foreseen that the trigger mechanism J-loop 65 may be functionally replaced by a conduit extending from and communicating with the siphon air trap 50 into the siphon liquid trap 52 so as to be in the leg 78 thereof associated with the discharge 53, provided that such conduit would extend substantially below the level of the floor 58 and into the fluid contained within the siphon liquid trap 52.

In operation, the present siphon 40 functions similarly to the siphon 1 of the previous embodiment. However, with the siphon 40, the trigger mechanism 42 initiates the flushing action at the end of an associated flushing cycle. In particular, near the beginning of a flushing cycle, when the siphon liquid trap 52 has filled or remains full of liquid, the trigger mechanism liquid trap 68 is likewise filled to a generally similar level as shown in FIG. 7. As the holding tank 41 fills with fluid, the fluid begins to rise within the siphon inlet 46. Eventually the air in the siphon air trap 50 and conduit 61 begins to pressurize which in turn exerts a hydraulic load or pressure upon the liquid in the upstream side of both the siphon liquid trap 52 and the trigger mechanism liquid trap 68. By "upstream side" is meant that side of each of the liquid traps 52 and 68 associated with the air trap 50 as opposed to the downstream side thereof which is associated with the siphon discharge 53. In particular, the pressure in the air trap 50 urges the fluid in the upstream sides of both liquid traps 52 and 68 downwardly until the level associated with reference numeral 75 is reached. At this time, air bypasses the trigger mechanism liquid trap 68 which thereby releases the air pressure in the air trap 50 and conduit 61. Fluid urged by the hydraulic head in the holding tank 41 and no longer impeded by the pressure of the air in the air trap 50 starts to flow through the siphon 40 associated with the J-loop 65. Simultaneously, the fluid begins to flow through the other siphons 40 associated with the trigger mechanism 42. In this manner, each of the siphons 40 is vigorously activated to initiate a flushing action so as to transfer liquid in the holding tank 41 in a relatively short period of time onto the floor surface 58 thereby flushing the trough 59.

It is to be understood that while certain embodiments of the present invention have been described and shown herein, it is not to be limited to the specific forms or arrangement of parts herein described and shown.

What is claimed and desired to be secured by Letters Patent is:

1. A siphon apparatus in combination with a fluid holding tank and a floor surface for flushing fluid from the fluid holding tank onto the floor surface comprising:
    (a) an inlet;
    (b) an air trap;
    (c) a liquid trap having a cross-sectional area;
    (d) a downcomer connecting said air trap and said liquid trap; and
    (e) a divergent dishcarge; said inlet, air trap, downcomer, liquid trap and discharge in that order sequentially flow communicating with one another;
    (f) said inlet being positioned within the fluid holding tank and flow communicating therewith; and
    (g) said discharge having a cross-sectional area substantially larger than the cross-sectional area of said liquid trap such that a flow velocity associated with the liquid passing through said siphon in the region of said discharge will be a substantially lower velocity as compared to a flow velocity associated with fluid passing through said trap; said discharge opening upward onto the floor surface; and said liquid trap being positioned beneath the floor surface; such that fluid is urged to remain in said liquid trap at the end of a flushing cycle associated with the siphon and thereby ensuring that said liquid trap is filled with fluid for a subsequent flushing cycle.

2. The siphon as set forth in claim 1 including:
    (a) a trigger mechanism comprising a conduit flow communicating at an upper end thereof with said air trap and at a lower end thereof with said liquid trap; said trigger mechanism conduit including a lower portion having an air bypass position located vertically above an air bypass position associated with said liquid trap, such that air pressurized in said air trap during a flushing cycle of said siphon will selectively flow through said trigger mechanism conduit before flowing through said liquid trap whereupon a flushing action of the siphon is initiated.

3. A first siphon apparatus in combination with a fluid holding tank and a floor surface for flushing fluid from the fluid holding tank onto the floor surface comprising:
   (a) an inlet;
   (b) an air trap;
   (c) a liquid trap having a cross-sectional area;
   (d) a downcomer connecting said air trap and said liquid trap; and
   (e) a divergent discharge; said inlet, air trap, downcomer, liquid trap and discharge in that order sequentially flow communicating with one another;
   (f) said inlet being positioned within the fluid holding tank and flow communicating therewith; and
   (g) said discharge having a cross-sectional area substantially larger than the cross-sectional area of said liquid trap such that a flow velocity associated with the liquid passing through said first siphon in the region of said discharge will be a substantially lower velocity as compared to a flow velocity associated with fluid passing through said trap; said discharge opening generally upwardly onto the floor surface; and said liquid trap being positioned beneath the floor surface; such that fluid is urged to remain in said liquid trap at the end of a flushing cycle associated with the first siphon and thereby ensure that said liquid trap is filled with fluid for a subsequent flushing cycle;
   (h) a trigger mechanism comprising a conduit flow communicating at an upper end thereof with said air trap and at a lower end thereof with said liquid trap; said trigger mechanism conduit including a lower portion having an air bypass position located vertically above an air bypass position associated with said liquid trap, such that air pressurized in said air trap during a flushing cycle of said first siphon will selectively flow through said trigger mechanism conduit before flowing through said liquid trap whereupon a flushing action of the first siphon is initiated; and
   (i) at least one additional siphon having an air trap associated therewith; said second siphon air trap being in flow communication with said trigger mechanism conduit, such that when flushing action is initiated in said first siphon that flushing action will be simultaneously initiated in said second siphon.

4. The apparatus according to claim 1 or 3 wherein:
   (a) said discharge is raised vertically on a first side thereof above an opposite second side thereof so as to direct flow of fluid on said floor surface.

5. A trough flushing apparatus comprising:
   (a) a liquid holding tank having a floor and a side wall;
   (b) a first siphon having in sequence an inlet, an air trap, a liquid trap, and an outlet; said inlet being positioned within and flow communicating with said holding tank; said outlet opening generally upwardly onto a floor surface to be flushed by the first siphon and being generally flush with at least a portion of said floor surface; said liquid trap being vertically spaced below and in gravity flow communication with said discharge; said first siphon having generally smooth and regular internal surfaces so as to maintain a high hydraulic efficiency therethrough;
   (c) said first siphon diverging in cross-sectional area substantially from said liquid trap to said discharge in a region associated with said discharge, such that liquid flowing through said region has a substantially lower velocity as compared to liquid flowing through a lower portion of said liquid trap;
   (d) whereby during a flushing cycle of the first siphon, as liquid rises within said holding tank, liquid also rises in said first siphon in a region closely associated with said inlet thereby compressing air in said air trap between said rising liquid and liquid contained within said liquid trap; when the liquid in the holding tank reaches a predetermined level, the pressure exerted by the air in the air trap is sufficient to force the liquid in a leg of said liquid trap associated with said air trap to be urged downwardly to a point whereat said compressed air may bypass said liquid trap and exit said first siphon through said discharge thereby releasing pressure from said air trap and allowing liquid in said holding tank to flow through said first siphon; after substantially all liquid in said holding tank has flowed through said first siphon said flushing cycle ends, however, a portion of said liquid is urged to remain within said liquid trap thereby priming said liquid trap for a later flushing cycle;
   (e) an automatic trigger mechanism comprising a conduit having a first end flow communicating with said air trap and a second end positioned in a leg of said liquid trap associated with said discharge; said conduit second end having an air bypassing location spaced vertically above an air bypassing location associated with said first siphon liquid trap; and
   (f) a second siphon having an air trap associated therewith; said second siphon air trap being in flow communication with said trigger mechanism first end whereby, when said trigger mechanism activates a flushing mode of said first siphon, air pressure decreases in the air trap of said second siphon and thereby initiates a simultaneous flushing action in said second siphon.

* * * * *